United States Patent
Bedolla et al.

(10) Patent No.: US 8,950,730 B2
(45) Date of Patent: Feb. 10, 2015

(54) AUTOMATIC SENSOR CONTROL PANEL

(75) Inventors: Ralph Bedolla, Gardena, CA (US);
Maria Block, Miraloma, CA (US);
Chun-Hui Yeh, Cerritos, CA (US)

(73) Assignee: Murisis Incorporated, Brea, CA (US)

( * ) Notice: Subject to any disclaimer, the term of this patent is extended or adjusted under 35 U.S.C. 154(b) by 262 days.

(21) Appl. No.: 13/444,714

(22) Filed: Apr. 11, 2012

(65) Prior Publication Data

US 2013/0233387 A1 Sep. 12, 2013

Related U.S. Application Data

(60) Provisional application No. 61/609,152, filed on Mar. 9, 2012.

(51) Int. Cl.
*F16K 31/02* (2006.01)

(52) U.S. Cl.
USPC .......................... 251/129.04; 137/606; 4/623

(58) Field of Classification Search
CPC .... E03C 1/057; G05D 23/1393; F16K 19/006
USPC ......... 137/606; 251/129.04; 4/623; 236/12.1, 236/12.15
See application file for complete search history.

(56) References Cited

U.S. PATENT DOCUMENTS

| | | | |
|---|---|---|---|
| 5,184,642 A | 2/1993 | Powell | |
| 5,577,660 A | 11/1996 | Hansen | |
| 5,868,311 A | 2/1999 | Cretu-Petra | |
| 5,918,855 A | 7/1999 | Hamanaka et al. | |
| 6,393,634 B1 | 5/2002 | Kodaira et al. | |
| 6,513,787 B1 | 2/2003 | Jeromson et al. | |
| 8,006,712 B2 * | 8/2011 | Boey | 137/15.17 |
| 2006/0186215 A1 | 8/2006 | Logan | |
| 2009/0039176 A1 | 2/2009 | Davidson et al. | |
| 2009/0056011 A1 * | 3/2009 | Wolf et al. | 4/623 |
| 2009/0119832 A1 * | 5/2009 | Conroy | 4/623 |
| 2011/0068192 A1 | 3/2011 | Klicpera | |
| 2011/0088799 A1 | 4/2011 | Jung | |
| 2011/0185493 A1 | 8/2011 | Chen | |

OTHER PUBLICATIONS

International Search Report for related PCT Application No. PCT/US2013/033579 dated Jun. 17, 2013.

\* cited by examiner

*Primary Examiner* — John K Fristoe, Jr.
*Assistant Examiner* — Reinaldo Sanchez-Medina
(74) *Attorney, Agent, or Firm* — Seyfarth Shaw LLP

(57) ABSTRACT

A method for regulating water output from a faucet is presented. The method includes receiving an input at a plurality of sensors, transmitting a signal to a control unit in response to receiving the input, controlling, via the control unit, at least a temperature or volume of water in response to the signal received at the plurality of sensors, outputting the water via a water output device, and outputting, via a display module, a visual indicator for at least the temperature or the volume.

18 Claims, 12 Drawing Sheets

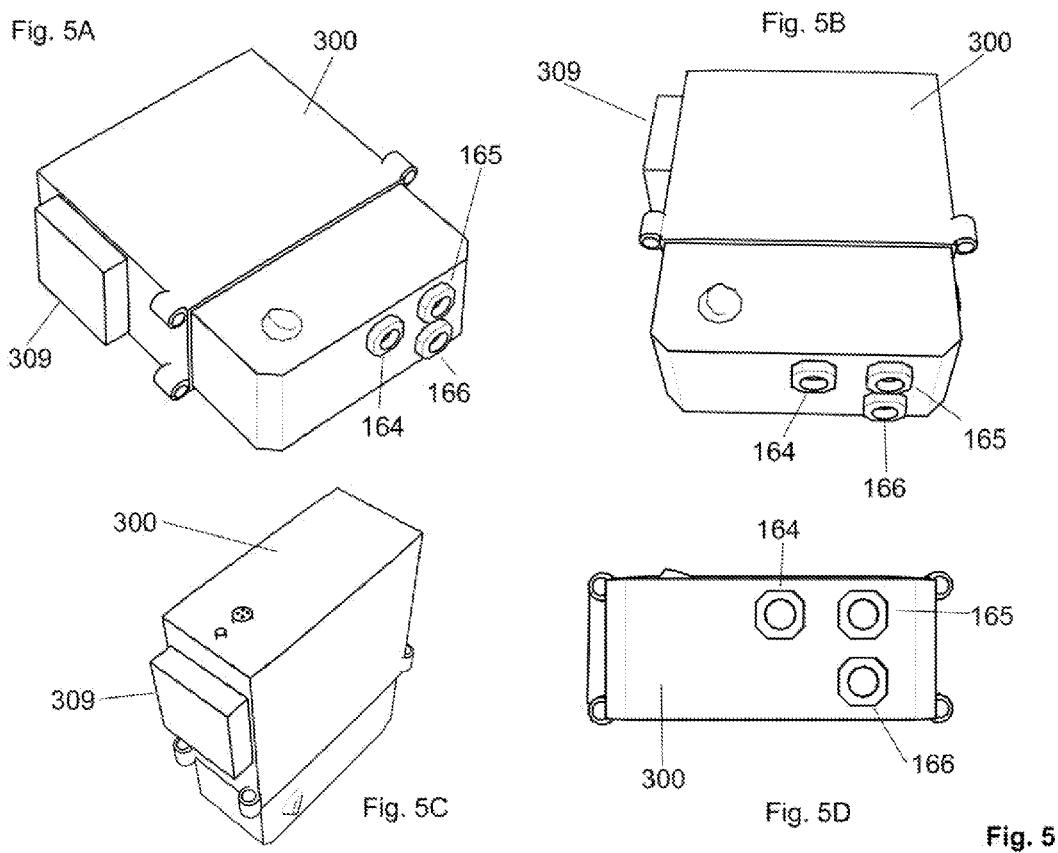

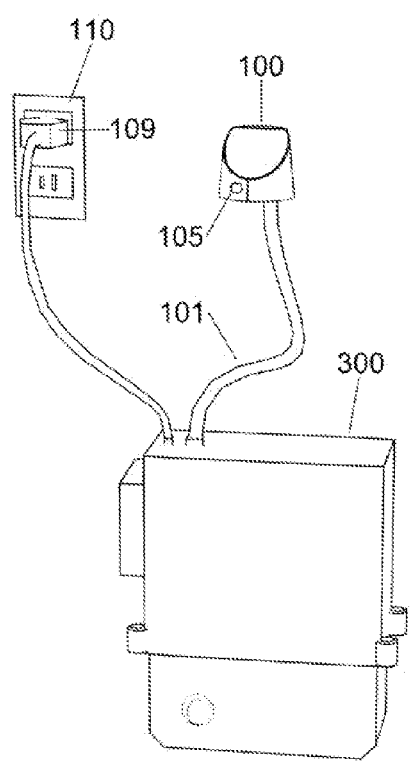
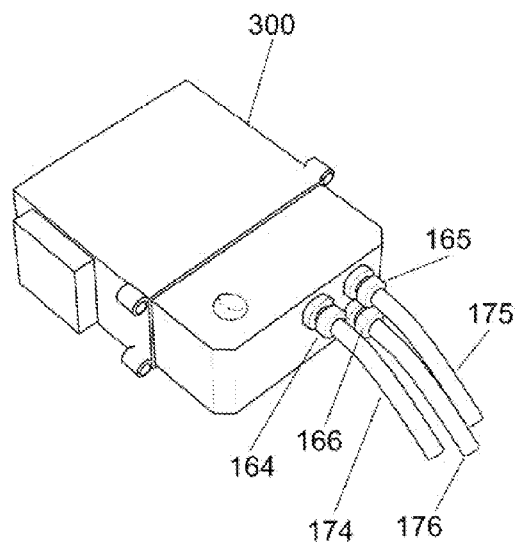
Fig. 6A
Fig. 6B
Fig. 6

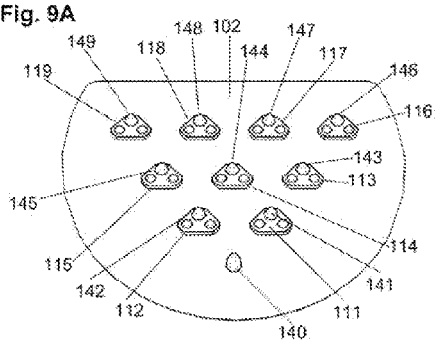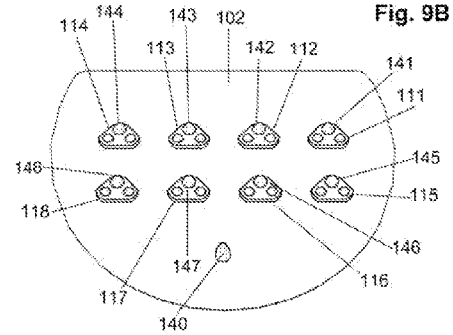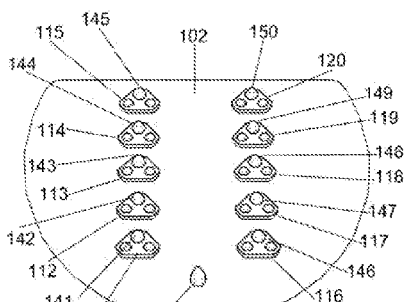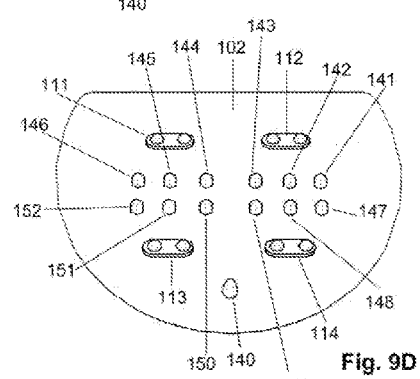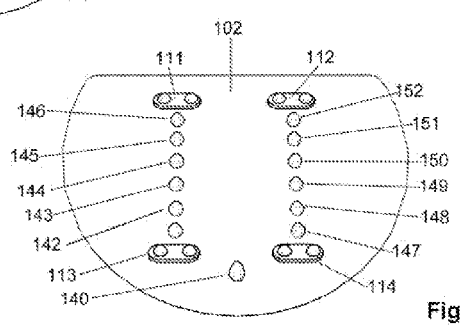

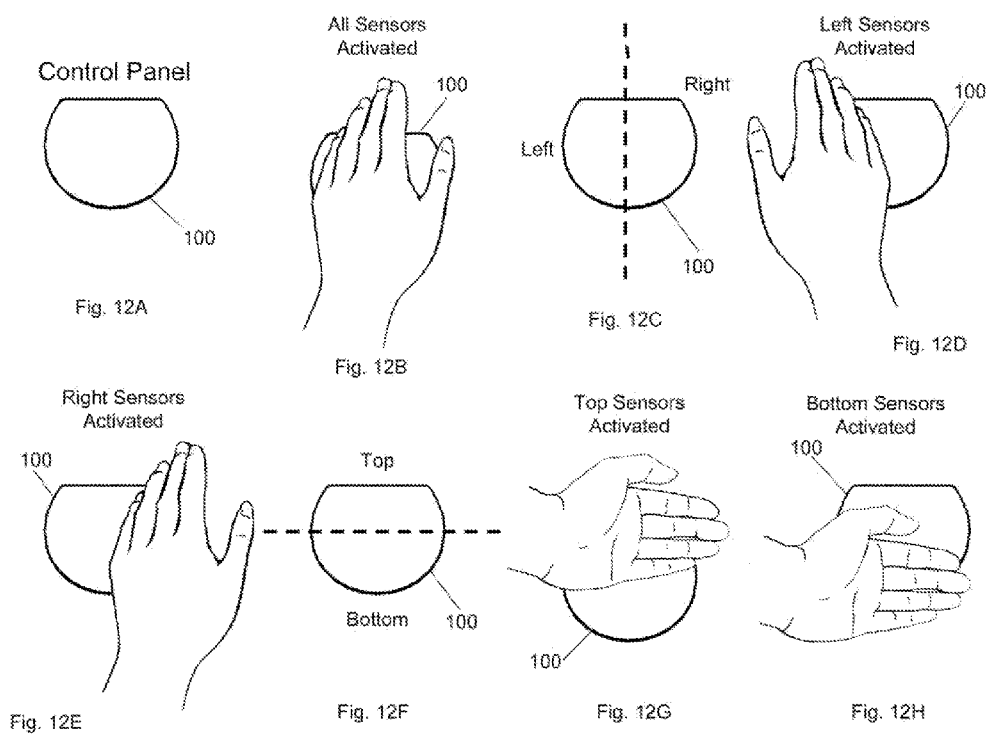

AUTOMATIC SENSOR CONTROL PANEL

CROSS REFERENCE TO RELATED APPLICATION

This application claims the benefit under 35 U.S.C. §119(e) to U.S. Provisional Patent Application No. 61/609,152 entitled "AUTOMATIC SENSOR CONTROL PANEL" filed on Mar. 9, 2012, the disclosure of which is expressly incorporated herein by reference in its entirety.

BACKGROUND OF THE DISCLOSURE

1. Field of Disclosure

This disclosure relates to an infra-red touch free sensor and control panel, and more specifically, to an infra-red touch free sensor and control panel for faucets or other plumbing fixtures.

2. Background

The use of automatic faucets and showers, also known as hands-free systems, have increased in popularity in recent years. These hands-free systems use infra-red touch free sensors to operate the water flow. The appeal and recent popularity of these systems may be attributed to the lack of knobs or levers needed to operate the faucet. Traditional faucets need a certain amount of force exerted on the knobs or levers for water to start flowing. But in the case of sensor operated faucets, no force is needed because the water flow begins in response to a user's hand entering a field of detection of the faucet's infra-red sensor.

Additionally, the physical manipulation of the knobs or levers may facilitate cross contamination of germs and bacteria. The germs and bacteria may be harmful to humans and dangerous in sterile environments such as a hospital.

Furthermore, over time, knobs and levers may become loose and worn out. Accordingly, a typical water dispenser system may not accurately deliver hot water or cold water when the knobs or levers wear out.

Thus, it is desired to provide a hands free system that accurately delivers water. However, traditional hands free systems only include a water on and water off function. Moreover, these traditional hands free systems do not provide a function for adjusting the water temperature. Therefore, it is desired to provide a hands free solution that offers a solution to adjust the water temperature and another solution to adjust the water flow.

SUMMARY

According to one aspect, a method for regulating water output from a faucet is presented. The method includes receiving an input at a plurality of sensors, transmitting a signal to a control unit in response to receiving the input, controlling, via the control unit, at least a temperature or volume of water in response to the signal received at the plurality of sensors, outputting the water via a water output device, and outputting, via a display module, a visual indicator for at least the temperature or the volume.

According to one feature, the plurality of sensors are infra-red touch free sensors.

According to another feature, transmitting the signal comprises transmitting a first signal when the water is output via the water output device, and transmitting a second signal when the water is not output via the water output device.

According to yet another feature, controlling the temperature comprises increasing the temperature in response to receiving the input via at least one first specific sensor of the plurality of sensors, and decreasing the temperature in response to receiving the input via at least one second specific sensor of the plurality of sensors.

According to still yet another feature, controlling the volume comprises increasing the volume in response to receiving the input via at least one first specific sensor of the plurality of sensors, and decreasing the volume in response to receiving the input via at least one second specific sensor of the plurality of sensors.

According to another feature, controlling the temperature comprises setting the temperature to a first temperature in response to receiving the input via at least one first specific sensor of the plurality of sensors, and setting the temperature to a second temperature in response to receiving the input via at least one second specific sensor of the plurality of sensors.

According to yet another feature, controlling the volume comprises setting the volume to a first volume in response to receiving the input via at least one first specific sensor of the plurality of sensors, and setting the volume to a second volume in response to receiving the input via at least one second specific sensor of the plurality of sensors.

According to still yet another feature, controlling the temperature and the volume comprises setting the volume to a first volume and the temperature to a first temperature in response to receiving the input via at least one first specific sensor of the plurality of sensors, and setting the volume to a second volume and the temperature to a second temperature in response to receiving the input via at least one second specific sensor of the plurality of sensors.

According to another aspect, a water regulating apparatus is presented. The apparatus includes a water output device configured to output water, an input unit configured to receive an input via a plurality of sensors, a control unit configured to transmit a signal to a control box in response to receiving the input, the control box configured to control at least a temperature or volume of the water in response to receiving the signal, output the water to the water output device, and a display module configured to output a visual indicator for at least the temperature or the volume in response to the input received at the input unit.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The above aspects, features and advantages of the present disclosure will become more apparent upon consideration of the following description of the preferred aspects taken in conjunction with the accompanying drawing figures.

FIGS. 5A-5D illustrate different perspectives of the control box according to an aspect of the disclosure.

FIGS. 6A-6B illustrate connections to the control box according to an aspect of the disclosure.

FIGS. 9A-9E illustrate various examples of the sensor and LED layouts defined within the control panel according to an aspect of the disclosure.

FIG. 12A-12H illustrate examples of activation methods for the sensors according to an aspect of the disclosure.

DETAILED DESCRIPTION OF THE ASPECTS

Figure 1:
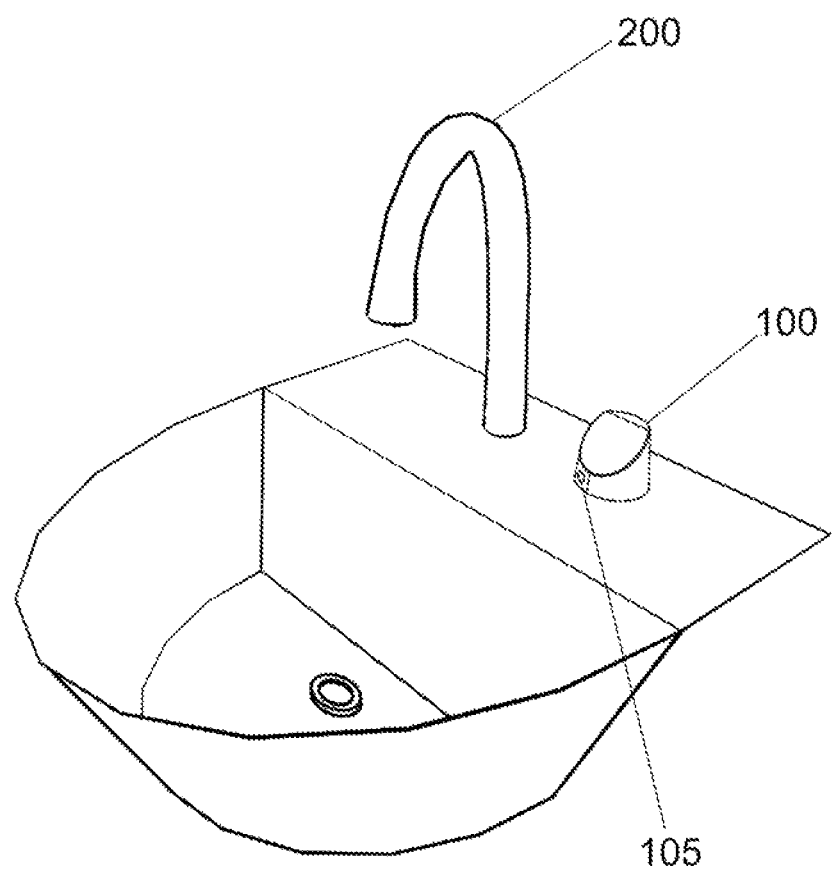
FIGS. 1 and 2 illustrate a hands-free system according to an aspect of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. The infra-red touch free control panel allows the user to acquire their desired water settings in one single step or in incremental steps using infra-red touch free sensors.

Several aspects of a hands-free system will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

According to one solution, the hands-free system may include a control panel installed in proximity to or on a plumbing fixture, such as a faucet or shower head. The control panel may include a series of infra-red touch free sensors for controlling various water settings.

For example, the control panel may be installed on adjacent to the plumbing fixture, such as on the countertop of the kitchen sink or the deck of a bathroom vanity. The control panel is connected to a control box consisting of a water mixing chamber. The water mixing chamber is defined within the control box and is connected to the hot water supply valve and the cold water supply valve via a hose, such as a stainless steel water supply hose. The output from the water mixing chamber is connected to the faucet. The control panel may be powered with an AC adapter or with batteries.

In one aspect of the present disclosure, the computer control module turns the water flow on or off when the user holds an input device, such as the user's hand, over the face of the control panel. The infra-red touch free sensors on the face of the control panel define a specific function when water is flowing and a different function when water is not flowing.

The control panel includes infra-red touch free sensors, emitter modules, and receiver modules. The infra-red touch free sensors, emitter modules, and receiver modules are built into individual clusters associated with a light emitting diode (LED). According to one aspect, various clusters on the control panel may be arranged in multiple formats, for example, the clusters may be arranged based on the desired operations and functions.

In one aspect, the user may hold their hand over a first specific side, such as a left side, of the control panel to activate a first function when the water is off. In this example, the water may be output from the faucet once the first function is activated. The user may then operate various sensors on the control panel to adjust the water settings, such as the temperature or volume of water flow. The current water settings for the first function may be saved when the water is turned off. It should be noted that in this disclosure, turning the water off refers to a scenario when the water is not output from a water output unit, furthermore, turning the water on refers to a scenario when that water is output from the water output unit.

According to present aspect, when the water is off, the user may hold their hand over a second specific side, such as a right side, of the control panel to activate a second function. In this example, the water is output from the facet when the second function is activated. The user may then operate various sensors on the control panel to adjust the water settings. The current water settings for the second function are saved when the water is turned off. The first function and the second function may be preset or set by a user.

The various sensors are connected to a computer control module. Specifically, a sensor control board relays a signal to the computer control module when the sensors are activated. The computer control module transmits the received signal to the water control valve and the correct water mixture is dispensed from the faucet according to the user's request.

The infra-red touch free sensors may simulate a full function traditional knob and lever faucet using a nonlinear digital method. The infra-red touch free sensors may also simulate a full function traditional knob and lever faucet using an incremental method.

As illustrated in FIG. 1, an aspect of this disclosure provides a control panel 100 in a housing. The housing may be waterproof and made of plastic, brass, aluminum or other material that is sturdy and moisture resistant. As illustrated in FIG. 1, the control panel 100 is installed adjacent to the faucet 200. Furthermore, an independent infra-red touch free sensor 105 may be defined on the control panel 100

Figure 2:
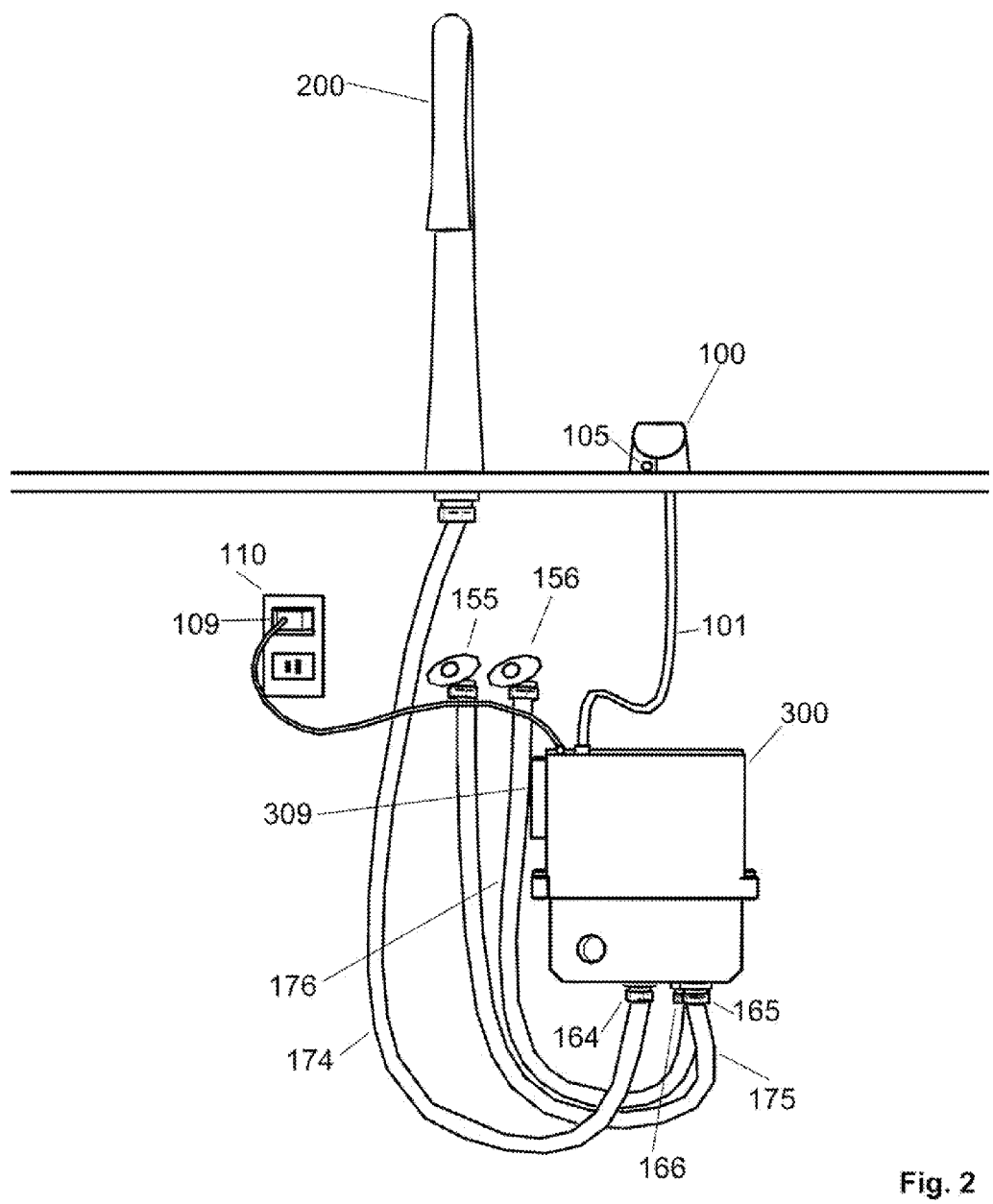

FIG. 2 illustrates various hardware elements of a hands-free system. As illustrated in FIG. 2 the faucet 200 is connect to the control box 300 via a water supply hose 174 connected to a water outlet 164. Furthermore, a hot water inlet 165 is connected to a hot water supply valve 155 via a hot water supply hose 175. Additionally, a cold water inlet 166 is connected to a cold water supply valve 156 via a cold water supply hose 176. Moreover, the control panel 100 is connected to the control box 300 via a controller cable 101

Furthermore, as illustrated in FIG. 2, the control box 300 may be powered via a low voltage AC adapter 109 that is connected to an electrical outlet 110. Additionally, the control box 300 may be powered via a battery box 309 containing batteries, such as four AA alkaline batteries or a lithium-ion battery.

Figure 3:
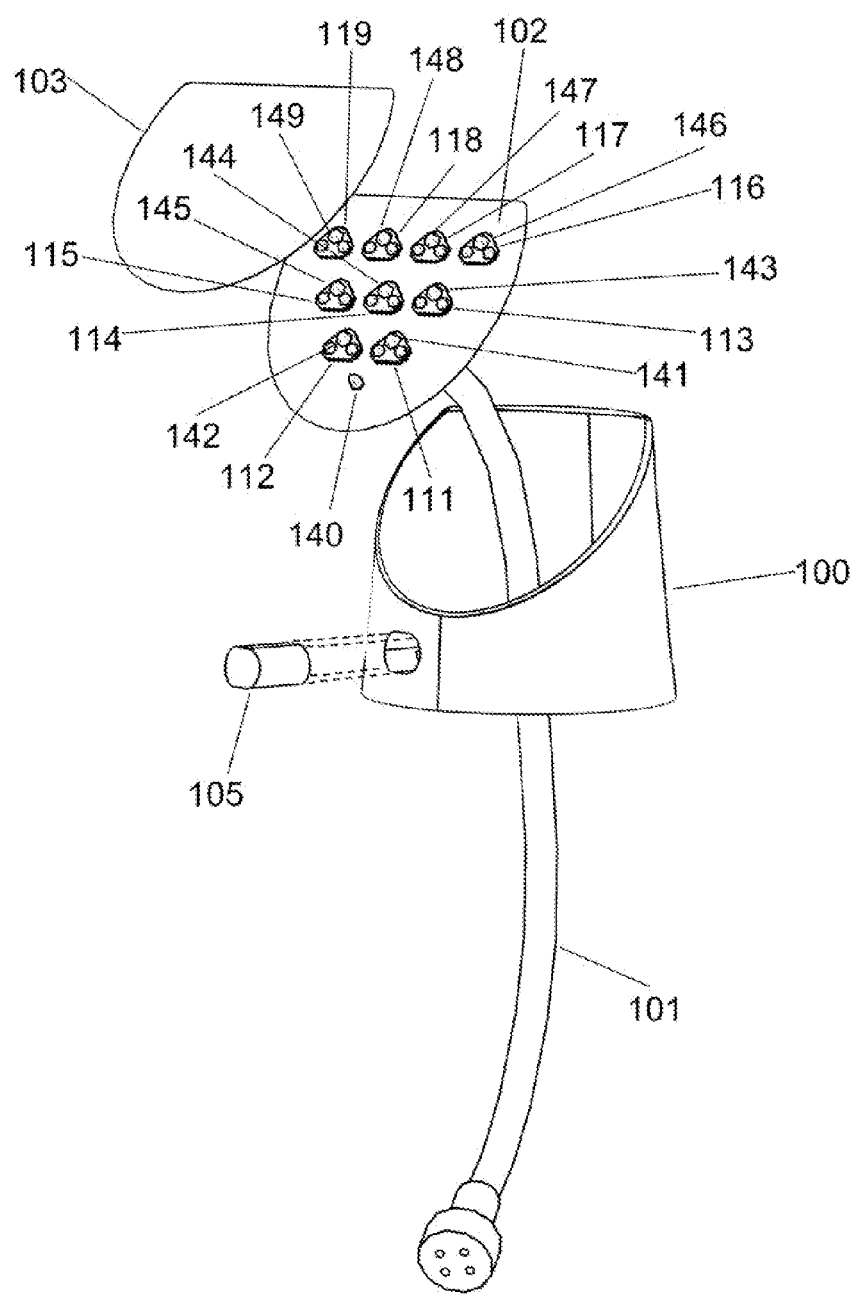
FIG. 3 illustrates a control panel according to an aspect of the disclosure.

FIG. 3 illustrates elements of a control panel according to an aspect of this disclosure. As illustrated in FIG. 3, infra-red touch free sensors 111-119 may be defined on a sensor control board 102. The infra-red touch free sensors 111-119 emit a light from an emitter module and receive light at a receiving module. Specifically, the infra-red touch free sensors 111-119 employ active infrared technology for sensing a presence of an object as opposed to a movement of an object. The infra-red touch free sensors 111-119 actively emit infrared light and actively wait for the light to return. In this disclosure the term sensor will refer to an infra-red touch free sensor.

In the present aspect, the emitter module may constantly emit infrared light in a blinking method. Additionally, the receiving module may always be ready to receive the blinking light that is reflected from an object, such as a hand. The sensor control board 102 may transmit a first signal to the control box 300 via a controller cable 101 when the receiving module receives the blinking light reflection and may transmit a second signal when the receiving module no longer receives the blinking light reflection.

Accordingly, the sensors 111-119 relay commands to the sensor control board 102 in response to receiving an input from the user. An independent infra-red touch free sensor 105 may be defined on a side of the control panel 100. The independent infra-red touch free sensor 105 is not defined on the sensor control board 102, however, the independent infra-red touch free sensor 105 may be connected to the sensor control board 102 and may transmit signals similar to the sensors 111-119. LEDs 141-149 associated with the sensor may omit light under control of the sensor control board 102. The sensors 111-119 and LEDs 141-149 are protected by a surface 103 that may be scratch resistant, such as glass or acrylic.

It should be noted that in a typical infra-red touch free system, the sensors are not defined within close proximity. That is, sensors placed in close proximity may interfere with each other and cause inappropriate readings due to the interference. The present disclosure provides a solution to mitigate the interference and thereby allow the sensors to be placed in close proximity.

In the present disclosure, in order to avoid interference, the receivers for each sensor are installed in a very specific and precise manner to mitigate the potential interference. Furthermore, the power for each receiver is reduced. The reduction in power may be achieved via the use of resistors and capacitors.

Figure 4:
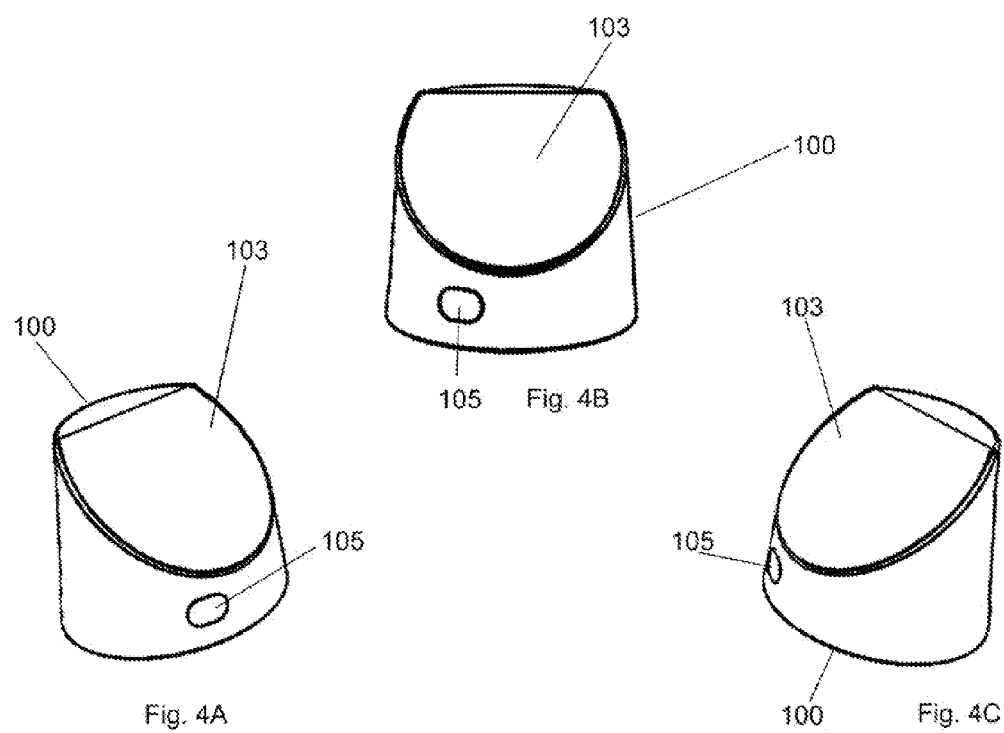
FIGS. 4A-4C illustrate different perspectives of the control panel according to an aspect of the disclosure.

FIGS. 4A-4C illustrate various perspectives of the control panel 100. Furthermore, FIGS. 5A-5D illustrate different perspectives of the control box according to an aspect of the disclosure. The control box 300 may be a waterproof material such as plastic. The control box 300 may house a water mixing control valve 301 (FIG. 7) and includes a hot water inlet 165, cold water inlet 166, and water outlet 164.

FIGS. 6A-6B illustrate connections to the control box according to an aspect of the disclosure. As illustrated in FIGS. 6A-6B a water supply hose 174 is connected to the water outlet 164. Furthermore, a hot water inlet 165 is connected to a hot water supply hose 175. Additionally, a cold water inlet 166 is connected to a cold water supply hose 176. Moreover, the control panel 100 is connected to the control box 300 via a controller cable 101. Furthermore, the control box 300 may be powered via a low voltage AC adapter 109 that is connected to an electrical outlet 110.

Figure 7:
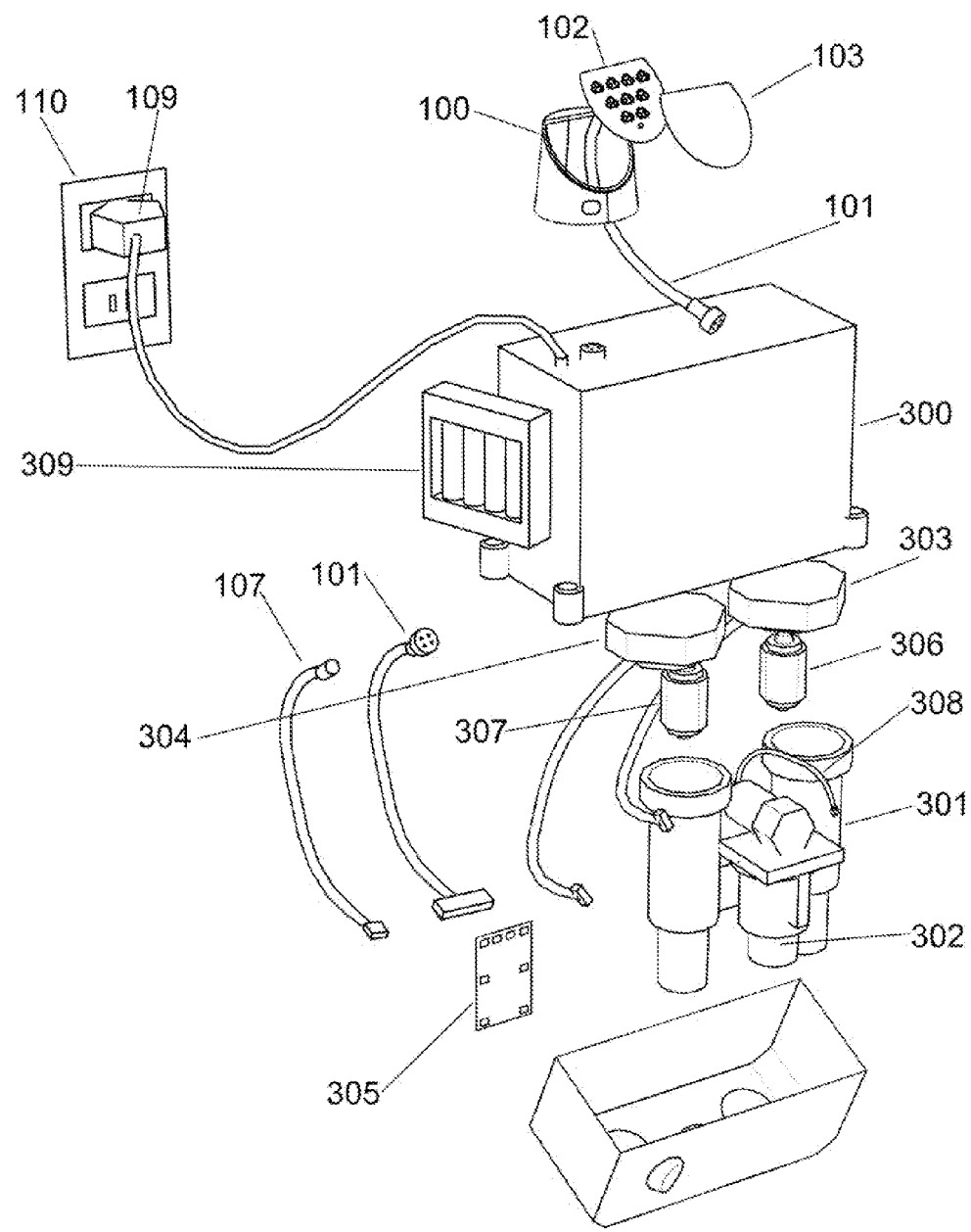
FIG. 7 illustrates internal parts for the control box according to an aspect of the disclosure.

FIG. 7 illustrates internal parts for the control box according to an aspect of the disclosure. As illustrated in FIG. 7, the control box 300 may house a water mixing control valve 301. The water mixing control valve 301 controls the hot water and cold water received from the main water supply and distributes the mixture to the faucet. The water mixing control valve 301 includes a primary water mixture control cartridge 306 and a secondary water mixture control cartridge 307. The primary cartridge 306 and secondary cartridge 307 are controlled with the use of micro gear motors 303 and 304. The micro gear motors 303 and 304 receive commands from the computer control module 305. The water mixing control valve 301 also includes a thermocouple 308 to record the temperature of the water in water mixing control valve 301. The thermocouple 308 is also attached to the computer control module, such that the water temperature is monitored by the computer control module 305 and the water's temperature is regulated to achieve the user's desired water temperature setting. According to one aspect, the computer control module may control the LEDs on the sensor control panel 102 to visually indicate the water temperature.

As illustrated in FIG. 7, the sensor control board 102 is connected to the computer control module 305 in the control box 300 via the controller cable 101. The computer control module 305 in the control box 300 receives and transmits signals from the sensor control board 102. Furthermore, the computer control module 305 may receive power from a power cord 107 connected to the AC adapter 109 and/or batter box 309.

Figure 8:
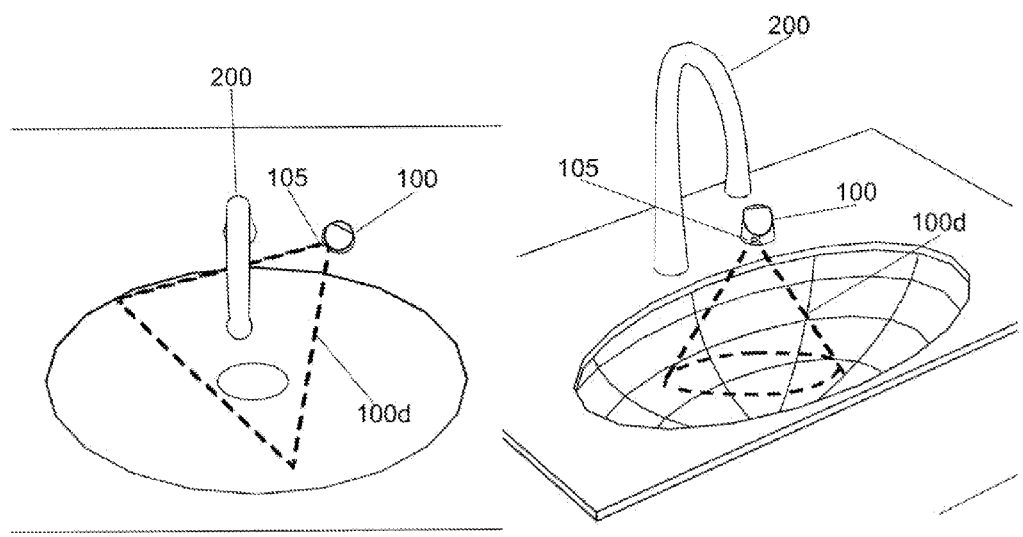
FIG. 8 illustrates a detection area of the automatic water function according to an aspect of the disclosure.

According to an aspect of the disclosure, as illustrated in FIG. 8, an independent infra-red touch free sensor 105 may be defined on a side of the control panel 100. The independent infra-red touch free sensor 105 may activate or de-active the water flow from the faucet 200. For example, the faucet 200 may output water when the independent infra-red touch free sensor 105 senses a presence of an object, such as a hand, in the detection area 100d. The faucet 200 will continue to output water until the object is no longer sensed in the detection area 100d. The automatic water output function may be deactivated via at least one sensor defined on the sensor control board 102. The sensors utilized to deactivate the automatic water output function may also reactivate the automatic water output function.

According to one aspect, a specific LED on the control panel may light up while the water is off and the automatic water flow sensor 105 is disabled or re-enabled. For example, the specific LED 140 may be one of a plurality of LEDs 140-152 (FIGS. 9A-9E). The specific LED may be lit for a specific time period or may be lit during the entire duration when the water is off.

As previously discussed, the automatic water output function may be activated or deactivated via at least one sensor 111-119 defined on the sensor control board 102. As an example, to activate automatic water output, the user may use their hand to cover the face of the control panel 100. Specifically, in this example, the automatic water output is activated when the user activates all of the sensors 111-119 on the sensor control board 102 (FIG. 9A). Furthermore, in this example, the continuous water flow is deactivated when the user reactivates all of the sensors 111-119 on the sensor control board 102. While the water is turned on, The current state of water is displayed via at least one LED defined one the sensor control board 102.

According to another aspect of the present disclosure, a single sensor or a plurality of the sensors define a specific function when water is being output from the faucet and a different function when water is not output from the faucet.

For example, activating a first sensor 118 (FIG. 9A) while the water is not being output may activate or deactivate the automatic water flow. Furthermore, in this example activating the first sensor 118, while water is being output from the faucet, may activate a pre-defined combination of water temperature and water flow.

According to another aspect of the present disclosure, a single sensor or a plurality of the sensors may be associated with specific water functions. For example, when the water output is off, the user may hold their hand over the a specific side, such as the left side, of the control panel to activate a first preset function. Once this function is activated, the water may be output from the faucet. As an example, water may be output when a plurality of sensors 112, 115, and 119 (FIG. 9A) are activated. Furthermore, in this example, the LEDs associated with the current water temperature and water volume may be lit when the water output is activated.

As yet another example, when the water output is off, the user may hold their hand over a specific side, such as the right side, of the control panel to activate a second preset function. Once this function is activated, the water may be output from the faucet. For example, water may be output when a plurality of sensors 111, 113, and 116 (FIG. 9A) are activated. the water starts flowing and specific LEDs may be lit. Furthermore, in this example, the LEDs associated with the current water temperature and water volume may be lit when the water output is activated.

According to the aspects discussed above, the control panel 100 may simulate a traditional lever faucet using a nonlinear digital solution. Specifically, a single sensor or a plurality of the sensors defined within the control panel 100 may be associated with specific functions to adjust at least water temperature, water flow, or a combination thereof. The specific functions may be pre-defined at the time of manufacturing or set by the user. Moreover, the LEDs associated with each sensor may be lit to represent different temperatures and water flow levels.

Various examples of configurations for the sensors 111-119 and LEDs 140-152 are illustrated in FIGS. 9A-9E. It should be noted that the examples of FIGS. 9A-9E are examples of various configurations and the sensors and LEDs are not limited to the example configurations illustrated in FIGS. 9A-9E.

As previously discussed, a single sensor or a plurality of the sensors defined within the control panel 100 may be associated with specific functions to adjust at least water temperature, water flow, or a combination thereof. For example, in one aspect, as illustrated in FIG. 9A, a first sensor 111 and a first LED 141 may be associated with a cold water temperature and low water flow, a second sensor 112 and a second LED 142 may be associated with a hot water temperature and low water flow, a third sensor 113 and a third LED 143 may be associated with a cold water temperature and medium water flow, a fourth sensor 114 and a fourth LED 144 may be associated with a water temperature (between mid-hot and warm) and medium water flow, a fifth sensor 115 and a fifth LED 145 may be associated with a hot water temperature and medium water flow, a sixth sensor 116 and a sixth LED 146 may be associated with a cold water temperature and high water flow, a seventh sensor 117 and a seventh LED 147 may be associated with a warm water temperature and high water flow, an eighth sensor 118 and an eighth LED 148 may be associated with a mid-hot water temperature and high water flow, and a ninth sensor 119 and a ninth LED 149 may be associated with a hot water temperature and high water flow.

In another example, with regard to FIG. 9B, a first sensor 111 and a first LED 141 may be associated with a cold water temperature, a second sensor 112 and a second LED 142 may be associated with a warm water temperature, a third sensor 113 and a third LED 143 may be associated with a mid-hot water temperature, a fourth sensor 114 and a fourth LED 144 may be associated with a hot water temperature, a fifth sensor 115 and a fifth LED 145 may be associated with a low water flow, a sixth sensor 116 and a sixth LED 146 may be associated with a small water flow, a seventh sensor 117 and a seventh LED 147 may be associated with a medium water flow, and an eighth sensor 118 and an eighth LED 148 may be associated with a high water flow.

In yet another example, with regard to FIG. 9C, a first sensor 111 and a first LED 141 may be associated with a no hot water flow, a second sensor 112 and a second LED 142 may be associated with a low hot water flow, a third sensor 113 and a third LED 143 may be associated with a small hot water flow, a fourth sensor 114 and a fourth LED 144 may be associated with a medium hot water flow, a fifth sensor 115 and a fifth LED 145 may be associated with a high hot water flow, a sixth sensor 116 and a sixth LED 146 may be associated with a no cold water flow, a seventh sensor 117 and a seventh LED 147 may be associated with a low cold water flow, an eighth sensor 118 and an eighth LED 148 may be associated with a small cold water flow, a ninth sensor 119 and a ninth LED 149 may be associated with a medium cold water flow, and a tenth sensor 120 and a tenth LED 150 may be associated with a high cold water flow.

In another aspect, a plurality of sensors may increase or decrease at least a water temperature, water flow, or a combination thereof. For example, with regard to FIG. 9D, while water is being output from the faucet, the user may simultaneously activate a first plurality of sensors 111 and 113 to increase the water temperature, alternatively, the user may decrease the water temperature by simultaneously activating a second plurality sensors 112 and 114. In another example, simultaneously activating a first plurality of sensors 111 and 112 may increase the water flow and simultaneously activating a second plurality of sensors 113 and 114 may decrease the water flow.

According to another aspect, a plurality of LEDs on the control panel may indicate the current state of a water temperature or water flow. For example, as illustrated in FIG. 9D, the a first set of LEDs 141-146 indicate the water temperature and may illuminate from one direction to another direction to indicate the current state of water temperature. For example, the right-most LED 141 may be associated with the lowest water temperature and the left-most LED 146 may be associated with the highest water temperature. Furthermore, a second set of LED's 147-152 may be associated with the water flow. Thus, in this example, the water flow LEDs 147-152 may illuminate from one direction to another direction to indicate the current state of water flow. Specifically, the right-most LED 147 may be associated with the lowest water flow and the left-most LED 152 may be associated with the highest water flow.

As yet another example, with regard to FIG. 9E, while water is flowing from the faucet, the user may simultaneously activate a first plurality of sensors 111 and 113 to increase the hot water volume, furthermore, the user may decrease the hot water volume by simultaneously activating a second plurality sensors 112 and 114. Additionally, the user may simultaneously activate a third plurality of sensors 111 and 112 to increase the cold water volume and simultaneously activate a fourth plurality of sensors 113 and 114 to decrease the cold water volume.

According to another aspect, a plurality of LEDs on the control panel may indicate the amount of hot water or cold water that is currently flowing from the faucet. For example, with regard to FIG. 9E, a first set of LEDs 141-146 on the control panel may indicate the hot water volume. Specifically, a first LED 141 on the bottom may be associated with a hot water volume of zero (e.g., no hot water is being output) while a second LED 146 on the top represents the highest hot water volume. The hot water volume LED's illuminate from the bottom to the top to indicate the current state of hot water volume. Additionally, the a second set LED's 147-152 on the control panel may indicate the cold water volume. For example, a third LED 147 on the bottom may be associated with a cold water volume of zero (e.g., no cold water is being output) while a fourth LED 152 on the top may be associated with the highest cold water volume. The cold water volume LED's illuminate from the bottom to the top to indicate the current state of water volume.

It is noted that the sensor and LED configuration are not limited to the configurations disclosed above and may be any configuration for setting or adjusting water flow and temperature.

As another example, while the water is being output, the user may activate the ninth sensor 119 (FIG. 9A) to set the temperature to a hot temperature and the water flow to a high water flow. Moreover, in response to activating the ninth sensor 119, the ninth LED 149 associated with the ninth sensor 119 will illuminate in red and the other LEDs may be dimmed. Alternatively, if the user selects the third sensor 113 to acquire cold water with a medium flow, the third LED 143 associated with the third sensor 113 may illuminate in blue and the other LEDs may be dimmed.

According to one aspect, when a water setting is activated, the LEDs associated with all of the settings from the current setting to the lowest setting will be activated. For example, with regard to FIG. 9B, the faucet may output medium hot water when the user activates the third sensor 113. Furthermore, the third LED 143 associated with the activated the third sensor 113 will be activated, furthermore, the LEDs associated with lower settings may be activated. In other words, LEDs associated with water temperatures that are less than the medium hot water temperature selected by the user will be activated. Moreover, as an example, if the user selects the fifth sensor 115 to achieve a low water flow, only the fifth LED 145 will illuminate because the low water flow may be the lowest setting available.

According to another aspect, with regard to FIG. 9B, the user may adjust the water temperature or the water flow in a single nonlinear step. For example, if the current water flow is set to a low water volume, the user may activate the eighth sensor 118 to request a high water flow. In this example, the user is not required to activate the sixth sensor 116 or the seventh sensor 117. Rather, the user may directly adjust the flow from low to high and bypass intermediary settings.

Figure 10:
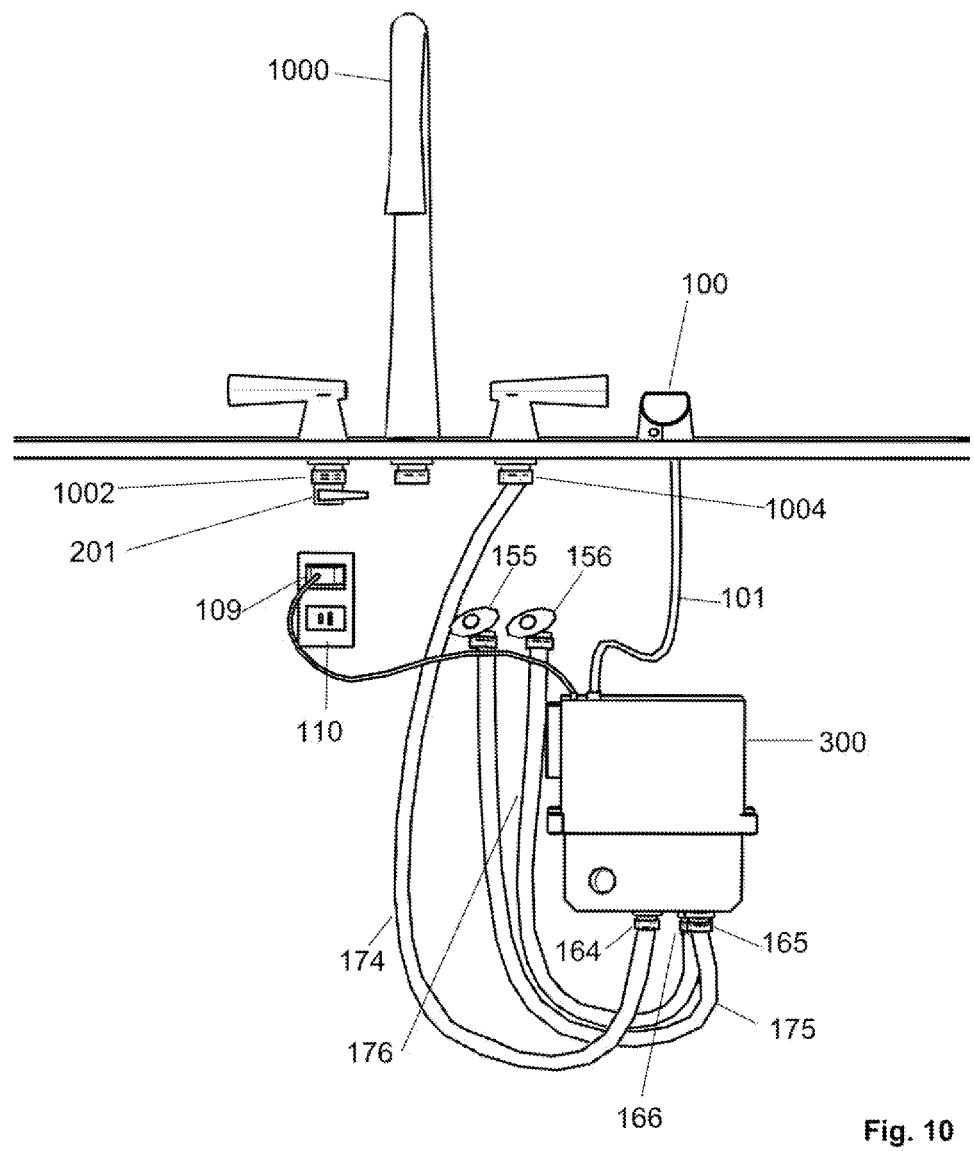
FIG. 10 illustrates connections for a water control system according to an aspect of the disclosure.

According to another aspect, as illustrated in FIG. 10, an existing faucet 1000 may be adapted with the control panel 100 and control box 300 in order to utilize the hands-free system. Specifically, as illustrated in FIG. 10, the hot water inlet 165 is connected to the hot water supply valve 155 and the cold water inlet 166 is connected to the cold water supply valve 156. The water outlet 164 is connected to a first inlet pipe 1004 of the existing faucet 1000 and a second inlet pipe 1002 is blocked via a shut off valve 201.

Figure 11:
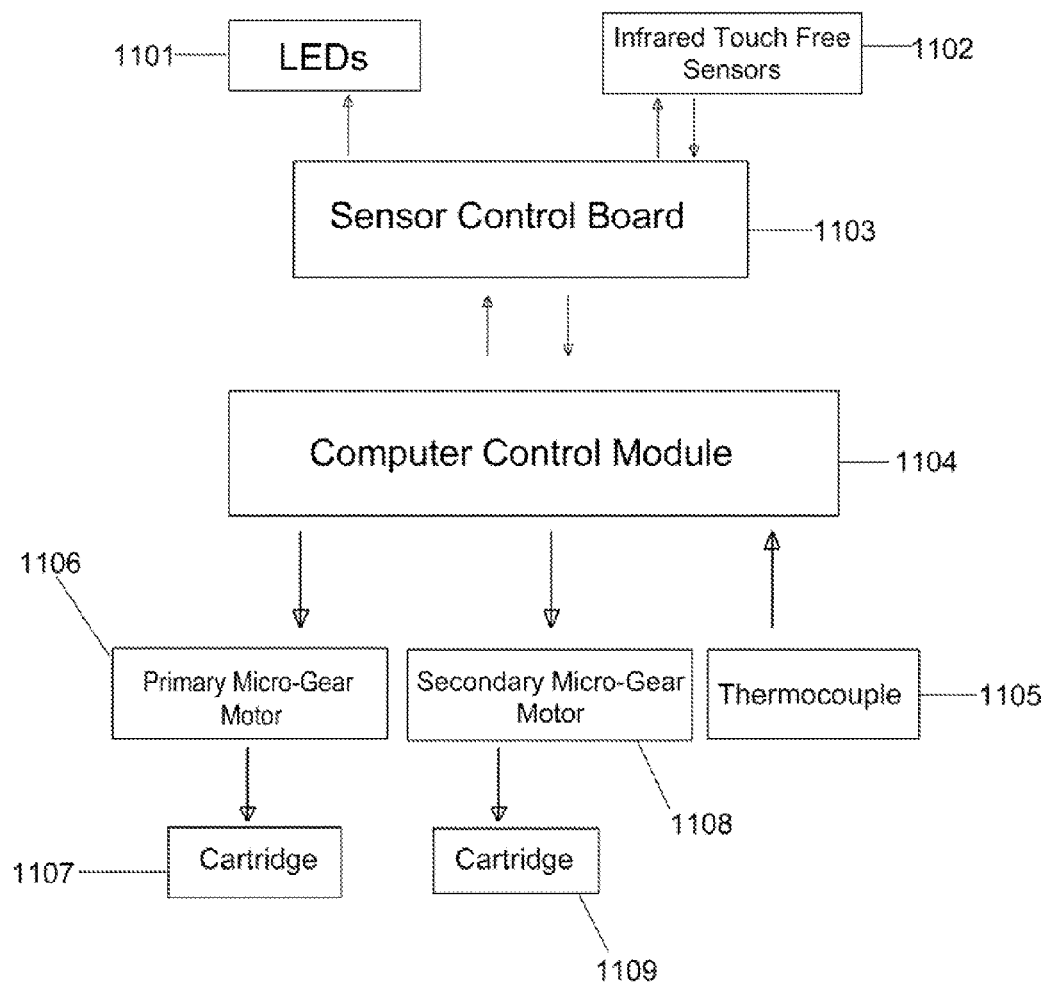
FIG. 11 illustrates the block diagram for the data flow of the control panel according to an aspect of the disclosure.

FIG. 11 illustrates a block diagram of a hand-free system according to an aspect of the disclosure. As illustrated in FIG. 11, the hand-free system may include LEDs 1101, infra-red touch free sensors 1102, a sensor control board 1103, a computer control module 1104, a thermocouple 1105, a primary micro-gear motor 1106 associated with a cartridge 1107, and a secondary micro-gear motor 1108 associated with a cartridge 1109. As discussed with other aspects of the disclosure, the infra-red touch free sensors 1102 may detect an object to receive an input and signals may be transmitted to the sensor control board 1103. The sensor control board 1103 may relay the signal to the computer control module 1104. The computer control module may then adjust the water settings using a primary micro-gear motor 1106 associated with a cartridge 1107 and/or a secondary micro-gear motor 1108 associated with a cartridge 1109. A thermocouple 1105 may monitor the water temperature and relay the temperature to the computer control module. Additionally, the computer control module may transmit the water temperature and the water flow to the sensor control board 1103 so that the sensor control board 1103 may control the LEDs 1101 to indicate at least the current temperature or water flow.

FIG. 12 illustrates various examples for activating the sensors on the control panel 100. As illustrated in FIG. 12B, the user's hand may cover the face of the control panel 100 to activate all sensors in order to activate or deactivate the continuous water flow. FIG. 12C illustrates an example of the left and right halves of the control panel 100. FIG. 12D illustrates the user's hand covering the sensors on the left side of the control panel 100 to activate a first preset function, such as outputting hot water. This operation may be functional when the faucet is not outputting water. FIG. 12E illustrates the user's hand covering the right side of the control panel 100 to activate a second preset function, such as outputting cold water. This operation may be functional when the faucet is not outputting water. FIG. 12F illustrates examples of the top and bottom halves of the control panel 100. FIG. 12G illustrates the user's hand covering the top half of the control panel 100 to activate a third preset function, such as activating, reactivating, or deactivating an automatic flow function. This operation may be functional when the faucet is not outputting water. FIG. 12H illustrates the user's hand covering the bottom half of the control panel 100 to activate a fourth preset function. This operation may be functional when the faucet is outputting water.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for regulating water output from a water output device, the method comprising:
   transmitting a first signal to a control unit in response to receiving a first input at a first output sensor, the signal being transmitted when water is not currently output from the water output device, and the first output sensor being used to enable continuous water output from the water output device until a fifth input is received at the first output sensor;
   outputting water, from a water mixing unit to the water output device, in response to the first signal, the water output having a predetermined first volume and first temperature when being output in response to the first input;
   transmitting a second signal to the control unit in response to receiving a second input at one or more of a plurality of adjusting sensors when water is currently output from the water output device, the plurality of adjusting sensors comprising a plurality of temperature sensors for controlling a temperature of water from the first temperature to a second temperature and a plurality of volume sensors for controlling a volume of water from the first volume to a second volume, the second volume being different from the first volume and the second temperature being different from the first temperature, and the first output sensor, the plurality of temperature sensors, and the plurality of volume sensors being infra-red touch free sensors, each infra-red touch free sensor being configured to operate at a reduced power and being defined at a specific distance in a housing from at least one adjacent infra-red touch free sensor in the housing to mitigate interference with the at least one adjacent infra-red touch free sensor, and each infra-red touch free sensor facing a same direction and having a same angle as each other infra-red touch free sensor that is defined in the housing;
   adjusting, via the water mixing unit, at least the temperature, the volume, or a combination thereof of the water output in response to the second signal; and
   outputting, via a plurality of indicators, a visual indication for the temperature and the volume of the water output, the plurality of indicators comprising at least a first set of indicators and a second set of indicators, each indicator of the first set of indicators being substantially adjacent to a corresponding sensor of the plurality of temperature sensors and each indicator of the second set of indicators being substantially adjacent corresponding sensor of the plurality of volume sensors.

2. The method of claim 1, in which adjusting the temperature comprises:
   increasing the temperature in response to receiving the second input via at least one first sensor of the plurality of temperature sensors; and
   decreasing the temperature in response to receiving the second input via at least one second sensor of the plurality of temperature sensors.

3. The method of claim 1, in which adjusting the volume comprises:
   increasing the volume from the first volume in response to receiving the second input via at least one first sensor of the plurality of volume sensors; and
   decreasing the volume from the first volume in response to receiving the second input via at least one second sensor of the plurality of volume sensors.

4. The method of claim 1, in which:
   the plurality of temperature sensors comprise at least four sensors, each sensor of the plurality of temperature sensors corresponding to a different temperature; and
   the plurality of volume sensors comprise at least four sensors, each sensor of the plurality of volume sensors corresponding to a different volume.

5. The method of claim 1, in which the first output sensor, the plurality of temperature sensors, the plurality of volume sensors, and the plurality of indicators are defined within the housing that is separate from the water output device.

6. The method of claim 1, further comprising:
   transmitting a third signal to the control unit in response to receiving a third input at a first set of sensors from the plurality of adjusting sensors when water is not currently output from the water output device;
   outputting water, from a water mixing unit to the water output device, in response to the third signal, the water output having a predetermined third volume and third temperature when being output in response to the third input;
   transmitting a fourth signal to the control unit in response to receiving a fourth input at a second set of sensors from the plurality of adjusting sensors when water is not currently output from the water output device; and
   outputting water, from a water mixing unit to the water output device, in response to the fourth signal, the water output having a predetermined fourth volume and fourth temperature when being output in response to the fourth input, the first set of sensors being different from the second set of sensors.

7. The method of claim 1, further comprising transmitting a fifth signal to a control unit in response to receiving a sixth input at a second output sensor that is defined on a surface that is different from the first output sensor, the fifth signal being transmitted when water is not currently output from the water output device, and the second output sensor being used to enable water output from the water output device for a predetermined time period.

8. A water regulating apparatus, comprising:
   a water output device configured to output water;
   a first output sensor configured:
      to receive a first input to enable continuous water output from the water output device until a fourth input is received at the first output sensor, and
      to transmit a first signal to a control unit in response to receiving the first input, the first signal being transmitted when water is not currently output from the water output device, and the water output having a predetermined first volume and first temperature when being output in response to the first input;
   a plurality of temperature sensors configured:
      to control a temperature of water from at least the first temperature to a second temperature in response to receiving a second input, the second temperature being less than or greater than first temperature; and
      to transmit a second signal to the control unit in response to receiving the second input, the second signal being transmitted when water is currently output from the water output device;
   a plurality of volume sensors configured:
      to control a volume of water from at least a first volume to a second volume in response to receiving a third input, the second volume being less than or greater than first volume; and
      to transmit a third signal to the control unit in response to receiving the third input, the third signal being transmitted when water is currently output from the water output device, and the first output sensor, the plurality of temperature sensors, and the plurality of volume sensors being infra-red touch free sensors, each infra-red touch free sensor being configured to operate at a reduced power and being defined at a specific distance in a housing from at least one adjacent infra-red touch free sensor in the housing to mitigate interference with the at least one adjacent infra-red touch free sensor, and each infra-red touch free sensor facing a same direction and having a same angle as each other infra-red touch free sensor that is defined in the housing;

the control unit configured to transmit a signal to a control box in response to receiving an input;

the control box configured to:
output the water to the water output device in response to receiving the first input; and
adjust at least a temperature, a volume, or a combination thereof of the water in response to receiving the second input, third input, or a combination thereof; and a plurality of indicators configured to provide a visual indication for the temperature and the volume of the water output, the plurality of indicators comprising at least a plurality of temperature indicators and a plurality of volume indicators, each indicator of the first set of indicators being substantially adjacent to a corresponding sensor of the plurality of temperature sensors and each indicator of the second set of indicators being substantially adjacent to a corresponding sensor of the plurality of volume sensors.

9. The apparatus of claim 8, in which the plurality of indicators are light emitting diodes (LEDs).

10. The apparatus of claim 8, in which the control unit is further configured to:
increase the temperature in response to receiving the second input via at least one first sensor of the plurality of temperature sensors; and
decrease the temperature in response to receiving the second input via at least one second sensor of the plurality of temperature sensors.

11. The apparatus of claim 8, in which the control unit is further configured to:
increase the volume from the first volume in response to receiving the third input via at least one first specific sensor of the plurality of volume sensors; and
decrease the volume from the first volume in response to receiving the third input via at least one second specific sensor of the plurality of volume sensors.

12. The apparatus of claim 8, in which the water output device is a faucet.

13. The apparatus of claim 8, in which the control box comprises a water mixing control valve body comprising at least two micro gear motors configured to combine hot water and cold water.

14. The apparatus of claim 8, in which:
the plurality of temperature sensors comprise at least four sensors, each sensor of the plurality of temperature sensors corresponding to a different temperature; and
the plurality of volume sensors comprise at least four sensors, each sensor of the plurality of volume sensors corresponding to a different volume.

15. The apparatus of claim 8, in which the first output sensor, the plurality of temperature sensors, the plurality of volume sensors, and the plurality of indicators are defined within the housing that is separate from the water output device.

16. The apparatus of claim 8, in which the control box is further configured:
to output the water to the water output device in response to receiving a fourth signal from a first set of sensors of at least the plurality of temperature sensors, the plurality of volume sensors, or a combination thereof when water is not currently output, the water having a predetermined third volume and third temperature when being output in response to the fourth signal; and
to output the water to the water output device in response to receiving a fifth signal from a second set of sensors of at least the plurality of temperature sensors, the plurality of volume sensors, or a combination thereof when water is not currently output, the water having a predetermined fourth volume and fourth temperature when being output in response to the fifth signal, the first set of sensors being different from the second set of sensors.

17. The apparatus of claim 8, further comprising:
a second output sensor that is defined on a surface that is different from the first output sensor, the second output sensor being configured:
to receive a fifth input to enable water output from the water output device for a predetermined time period, and
to transmit a sixth signal to a control unit in response to receiving the fifth input, the sixth signal being transmitted when water is not currently output from the water output device.

18. An apparatus for regulating water output, the apparatus comprising:
means for transmitting a first signal to a control unit in response to receiving a first input at an output sensor, the signal being transmitted when water is not currently output from a water output device, and the output sensor being used to enable continuous water output from the water output device until a third input is received at the output sensor;
means for outputting water, from a water mixing unit to the water output device, in response to the first signal, the water output having a predetermined first volume and first temperature when being output in response to the first input;
means for transmitting a second signal to the control unit in response to receiving a second input at one or more of a plurality of adjusting sensors when water is currently output from the water output device, the plurality of adjusting sensors comprising a plurality of temperature sensors for controlling a temperature of water from the first temperature to a second temperature and a plurality of volume sensors for controlling a volume of water from the first volume to a second volume, the second volume being different from the first volume and the second temperature being different from the first temperature, and the first output sensor, the plurality of temperature sensors, and the plurality of volume sensors being infra-red touch free sensors, each infra-red touch free sensor being configured to operate at a reduced power and being defined at a specific distance in a housing from at least one adjacent infra-red touch free sensor in the housing to mitigate interference with the at least one adjacent infra-red touch free sensor, and each infra-red touch free sensor facing a same direction and having a same angle as each other infra-red touch free sensor that is defined in the housing;
means for adjusting, via the water mixing unit, at least the temperature, the volume, or a combination thereof of the water output in response to the second signal; and means for outputting, via a plurality of indicators, a visual indication for the temperature and the volume of the water output, the plurality of indicators comprising at least a first set of indicators and a second set of indicators, each indicator of the first set of indicators being substantially adjacent to a corresponding sensor of the plurality of temperature sensors and each indicator of the second set of indicators being substantially adjacent to a corresponding sensor of the plurality of volume sensors.

* * * * *

UNITED STATES PATENT AND TRADEMARK OFFICE
CERTIFICATE OF CORRECTION

PATENT NO.         : 8,950,730 B2                                             Page 1 of 1
APPLICATION NO.    : 13/444714
DATED              : February 10, 2015
INVENTOR(S)        : Ralph Bedolla et al.

It is certified that error appears in the above-identified patent and that said Letters Patent is hereby corrected as shown below:

On the Title Page

Item (73) Assignee, please correct to read --Muirsis Incorporated, Brea, CA (US)--

Signed and Sealed this
Twenty-ninth Day of September, 2015

Michelle K. Lee
*Director of the United States Patent and Trademark Office*